United States Patent [19]

Bolle et al.

[11] Patent Number: 4,515,994

[45] Date of Patent: May 7, 1985

[54] COMBINATION ELECTRONIC ROAD GUIDANCE AND COMMUNICATION SYSTEM FOR VEHICLES

[75] Inventors: Günter Bolle, Diekholzen; Peter Brägas, Hildesheim-Itzum; Bernd Eschke, Bad Salzdetfurth, all of Fed. Rep. of Germany

[73] Assignee: Robert Bosch GmbH, Stuttgart, Fed. Rep. of Germany

[21] Appl. No.: 545,532

[22] Filed: Oct. 26, 1983

[30] Foreign Application Priority Data

Nov. 6, 1982 [DE] Fed. Rep. of Germany ....... 3241022

[51] Int. Cl.³ ............................................ H04M 11/00

[52] U.S. Cl. .................................... 179/2 R; 179/2 E; 179/82

[58] Field of Search .................... 179/2 R, 2 E–2 EC, 179/2 A, 2 C, 82; 455/41, 89, 99

[56] References Cited

U.S. PATENT DOCUMENTS

| | | | |
|---|---|---|---|
| 3,101,394 | 8/1963 | Quinn | 179/82 |
| 3,383,595 | 5/1968 | Obata | 179/82 X |
| 3,470,474 | 9/1969 | Rohrer | 179/82 X |

FOREIGN PATENT DOCUMENTS

| | | |
|---|---|---|
| EP0004088B1 | 3/1979 | European Pat. Off. . |
| 2515660 | 10/1976 | Fed. Rep. of Germany . |

*Primary Examiner*—Gene Z. Rubinson
*Assistant Examiner*—W. J. Brady
*Attorney, Agent, or Firm*—Frishauf, Holtz, Goodman & Woodward

[57] ABSTRACT

An automobile equipped with the vehicular portion of a traffic information and guidance system utilizing exchange of data between vehicles and the rest of the system through inductive coupling with loops set at various places in roadways, is provided with two-way telephone communication possibilities at places where roadway loops are provided where a car can stop for making a telephone call, as for example in a parking space. Only small amounts of equipment need to be added to the vehicle and to the fixed installations to permit telephone communication between the vehicle and telephones in a public network. Separate receivers and transmitters for speech communication operated with amplitude or frequency modulation can be switched in, or else the speech signals can be converted into pulse code modulation and simply supplied through input/output units to the data transmitter/receiver of the traffic information system. The telephone calling features are enabled only when the travel path measuring device of the traffic information system is at rest, but the vehicle can be reached while in motion by a paging system to ask the driver to stop at the next telephone communication location.

16 Claims, 4 Drawing Figures

COMBINATION ELECTRONIC ROAD GUIDANCE AND COMMUNICATION SYSTEM FOR VEHICLES

This invention concerns the incorporation of vehicular telephone communication facilities in an inductive digital electronic route and destination guidance system, so that vehicles may economically be provided both with guiding advice towards their destinations and with the capability of connection to a public telephone system without leaving the vehicle.

An inductive traffic guidance system for helping drivers of vehicles to reach the destinations they select and enter into an apparatus in the particular vehicle is disclosed in German published patent application (OS) No. 25 15 660. In that system, loops for electrical inductive communication are built into road surfacing at various locations. If a vehicle drives over such a road loop, information is transmitted between the vehicle and a communication station, the vehicle driver first transmitting his destination and the communication station then providing him information of importance to him, such as indication of direction to travel, road conditions, suitable speed, and the like, this information being transmitted automatically and being displayed in the vehicle on a visible display. Such guidance to destination systems for vehicular traffic are also disclosed in European patent application No. 79 100 732.1, and in the following articles: "ALI System for Destination Guidance and Traffic Data Provision", Radio Mentor Elektronik, Vol. 44, No. 3, (Berlin, 1978) pp. 103–108, and "Elektronik Sign Post for Auto Drivers", NTZ, Vol. 28, No. 8 (1975), pp. 306–308. The known systems have the disadvantage that a reply by the vehicle driver for transmitting information other than destination is not possible.

Computer controlled telephone systems are also known, such as, for example, the system produced by the Bosch company under the designation OF4D. These computer controlled telephone systems utilize a transmitter and a receiver making possible radio contact to a relay station. Signal transmission usually takes place in the ultra-high frequency range. These known radio telephone equipments are very expensive, however, and are also unreliable, because on the one hand much complication and expense must be devoted to the privacy of the transmission and on the other hand, only few frequency ranges are available for these transmissions, so that the radio telephone customer often finds no free channels. A further disadvantage of computer controlled radio telephone systems is that even limited privacy is far from completely assured.

It is an object of the present invention to provide inexpensive means for communication between vehicles and fixed telephone stations, especially telephones of a general public telephone network, whenever the vehicle is equipped with a traffic information and guidance system of the kind already mentioned.

Briefly, at least some of the roadway transmitter/receiver installations of the traffic information and guidance system are set in parking and/or roadside pause areas for exchange of signals with temporarily stationary vehicles. In one embodiment of the invention, separate transmitter/receiver facilities are connected to the vehicle loop and to the street loop for transmitting analog speech signals by amplitude or frequency modulation of a carrier frequency. In another embodiment, the speech signals are transmitted digitally. The station selection (dialing) signals and the supervisory signals for telephone conversations can be provided as tones in the speech channel or they may be handled, at least prior to establishment of a telephone connection, through the digital signals of the traffic information and guidance system. Since the inductive communication part of the connection, like a radio link, is a so-called "four wire" telephone circuit, the usual two-wire to four-wire circuits and vice versa, known as "hybrids" or "termination sets" for short, are necessary for the two-way telephone connection, as is well known in telephone practice. Preferably, when the speech transmission is digital, one digital word or "byte" is sent alternately in each direction, thus providing a time division channel in each direction continuously.

The system of the invention has the advantage that an already provided traffic information and guidance system provides the inductive loops and much other equipment that can be used for telephone communication as well as for the traffic information and guidance and, furthermore, that the inductive system offers the possibility of accommodating more than one two-way speech channel. The additional equipment necessary for telephone communication is much less expensive than what is necessary for the usual mobile radio installation, thus offering possibilities of great expansion of telephone communication with vehicles. Furthermore, the system has inherent protection of privacy, because the inductive field used for the vehicular link operates at low power and falls off in intensity with distance with a much greater rate than a radio signal field. It is particularly advantageous to utilize the possibilities of speech communication offered by the invention beyond the limits of the traffic information and guidance system and traffic control personnel and to extend it even to connection with the public service telephone communication system of the particular country or area.

The supervisory frequencies for telephone communications can advantageously and readily be derived from the clock frequency of the traffic information and guidance system, and likewise selective calling tones or pulses.

For charging of telephone system tolls and for mitigating misuse of the system, it is advantageous to provide for interrogation of the vehicle by the fixed system and the furnishing of an identifying code by the vehicle equipment before the setting up of a telephone connection. The vehicle/user code can also be used in automatic message accounting of the telephone system for accounting and billing purposes. Where the European system of charging by means of pulse counting prevails, the charges for each call can of course be accumlated in the vehicle as well as in the fixed telephone service installation.

The most economical embodiment of the invention for utilizing the vehicle-mounted equipment used for traffic information and guidance involves merely adding an additional transmitter and an additional receiver, connected to the same inductive transmitting and receiving loop, arranged for being switched in for speech transmission. This additional transmitter and receiver will be controlled by supervisory signals derived from the clock pulses of the traffic information system and transmitted and received in accordance with usual telephone practice. The additional transmitter and receiver can advantageously operate with frequency modulation or amplitude modulation. On the other hand, the possibility of subjecting the speech signals to conversion into digital form and back involves a minimum of modification of the traffic information and guidance equipment. In this case, it is advantageous to provide registers in which the converted signals can be stored. That makes it easy to send stored signals alternately in each direction and avoiding the necessity of using push-button or voice-operated equipment for directional control. It is also advantageous to have a travel detector in the vehicle so that the telephone communication mode of operation can be switched in only when the motion detector indicates that the vehicle is stopped. In fact, it is also possible to block the setting of the vehicle into motion until the telephone communication is completed in order to avoid interruption of the telephone connection without the provision of the usual supervisory disconnect signal. It is of course advantageous to utilize a microcomputer that may be in the traffic information and guidance unit of the vehicle to store telephone numbers and to operate automatic repetition of called numbers. It is also advantageous to equip the combined traffic and telephone system of the vehicle with a receiver serving a regional paging system, so that the driver of the vehicle will be notified of a telephone number to be called at the next opportunity offered by the system of the present invention. In Europe this means the installation of a "Euro-signal" and provision for displaying or announcing attempts to reach someone in the particular vehicle.

BRIEF DESCRIPTION OF THE DRAWINGS

The invention is further described by way of illustrative examples with reference to the annexed drawings, in which.

DESCRIPTION OF THE PREFERRED EMBODIMENTS

Figure 1:
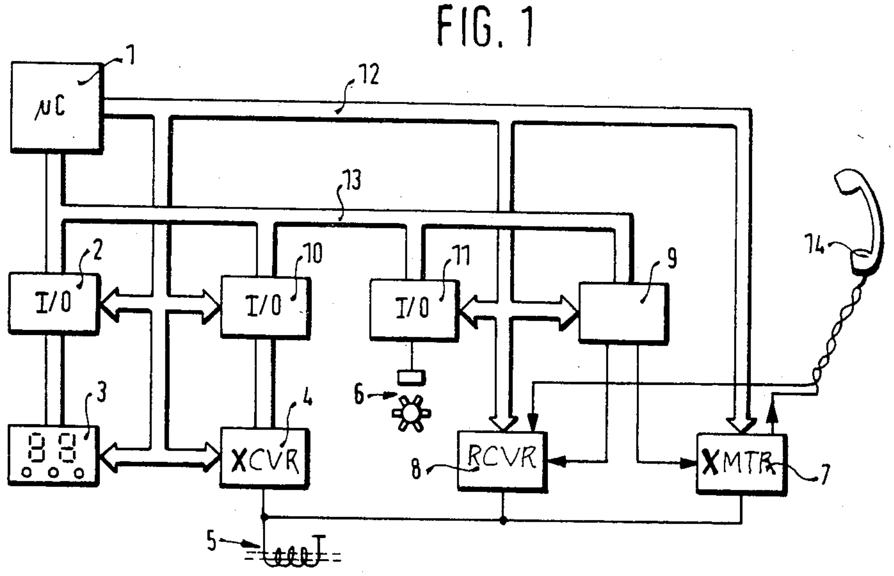
FIG. 1 is a block circuit diagram of a first embodiment of the vehicular portion of the apparatus of the invention.

Traffic information and guiding systems for expressways and other main highways have been known for a long time. In one known system of this sort which has been made available to the public under the designation ALI, induction loops are built into the roadways. These induction loops are located either in the surface of the highway or else in parking areas and expressway entrance ramps. A process computer is connected in each case to the induction loop and is itself connected by data connections to a central computer. In this way the flow of traffic can be optimized by accumulating and distributing traffic information and thereby influencing the flow of traffic. Contact with the automobile driver is completed through a vehicle-mounted device to which the output information is communicated through the induction loop. Information flows in both possible direction. The driver must before going into the system enter his destination in the form of a decimal number into the vehicle-mounted apparatus. When he drives over an induction loop the vehicle mounted apparatus is activated and these data are transmitted to the process computer which acts as a satellite or peripheral device for the central computer. The process computer then makes available for the individual case how the driver of the vehicle can reach his particular destination by the way which is shortest in time.

The principle of interactive transmission is based on the fact that with a transmitter, receiver, destination entry keyboard and optical display field, as well as a vehicle equipped with a special antenna (typically or ferrite rod), a vehicle can automatically announce its presence and destination when it enters the operating region of the system. The information is first picked up in an induction loop and then transmitted by wire to an apparatus located adjacent to the roadway (which may be referred to as the road apparatus). The road apparatus has a microcomputer equipped with a store, from which the prescribed directional recommendation corresponding to the particular intended destination of the vehicle are obtained and transmitted back to the vehicle over the same induction loop. The directional recommendations also contain speed recommendations as well as announcements and warnings regarding traffic accumulation or jams and any risks of fog and/or ice. Complete details about the practical construction of the vehicle equipment as well as the roadway loops and roadside computer installations are obtainable in the publications already mentioned above and also in the BMFT report (Bericht) "Felderprobung eines Zielführungs- und tionssystems für Autofahrer (ALI)".

Building on the base of such a system it ought to be possible in principle to receive and to send data other than information relating to traffic by means of the transmitting and receiving unit in the motor vehicle. This is the starting point of the invention, leading to the possibility of modifying the data transmitting and receiving unit for traffic information so that it can also be used for transmitting telephone conversations or other information.

Whereas the traffic information takes place, and to some extent must take place, during travel of the vehicle past particular places, it is possible to make a wireless connection to the public telephone network by means of loops that are located under marked parking places or on paved shoulder strips of a roadway or other publicly accessible areas, so that telephone conversations may be possible from a motionless vehicle.

The stationary telephone and data station, accordingly, instead of having a telephone booth into which a person would have to go after leaving his car, consists of a loop disposed under the roadway or parking space surface and supplementary equipment for transmitting speech communication. The vehicle-mounted equipment includes supplementary equipment making possible speech transmission through the vehicle equipment. These respectively fixed and mobile installations convert the usual signals of speech transmissions on both sides of the inductive link into a form that assures reliable transmission through the traffic information system. To complete the equipment, as already mentioned, it is convenient to provide enablement of the speech communication equipment only when the vehicle is stationary and to equip the vehicle with a paging receiver so that the vehicle drive can also be "paged" as he travels on the road and asked to call a particular place or number. The driver then drives to the nearest parking space that is designated as a telephone loop parking space. Displacing the telephone instrument in the vehicle initiates the search for a free channel, where, as soon as correct and reliable signal transmission has been found to have been established, the usual dial tone or other indication of readiness is provided. Then the conventional dialing of the called party is performed, the conversation carried on in the usual way and then terminated. The necessary toll information is generated in the apparatus associated with the loop, or, if the pulse method of charging for calls which is prevalent in Europe is in effect, the number of toll units used can be registered in the vehicular equipment, in the roadway equipment, or both.

The vehicle on-board equipment can include, in addition to the telephone, all devices which have already been introduced into stationary telephony (e.g. picture screen text apparatus). The system is extendable to all apparatus which can be connected to the public telephone network.

THE FIRST ILLUSTRATED EMBODIMENT

FIG. 1 shows equipment built into a vehicle which can function for the transmission of telephone conversation as well as for the reception and transmission of traffic information. The normal traffic information vehicle equipment contains a microprocessor 1 that is provided with stores both for its program and for data. This microprocessor 1 has access over a control bus to a display and input unit 3, to a transmitter-receiver 4 readily switchable from transmission to reception and back, to input/output units 2, 10 and 11, to clock pulse preparation circuits 9, to a transmitter 7 and a receiver 8. The component groups just named are connected with the data bus 13 of the microcomputer through input/output units 2, 10 and 11. The transmitters and receivers 4, 7 and 8 are also connected to a ferrite antenna 5 which serves for data transport between it and the loop of the roadway equipment set in the roadway. In addition, a travel path transmitter 6 which produces signals from which the vehicle motion can be measured is connected with the input/output unit 11. Apart from the components 7, 8 and 9 the various components shown are contained in every traffic information apparatus of the ALI type and are described in detail in the publications cited above. The transmitter 8 and the receiver 7 are additions to the system which are necessary for connection of a telephone to a traffic information loop apparatus. This transmitter and this receiver utilize the same ferrite antenna as is used by the transmitter/receiver unit 4 of the traffic information apparatus.

Figure 2:
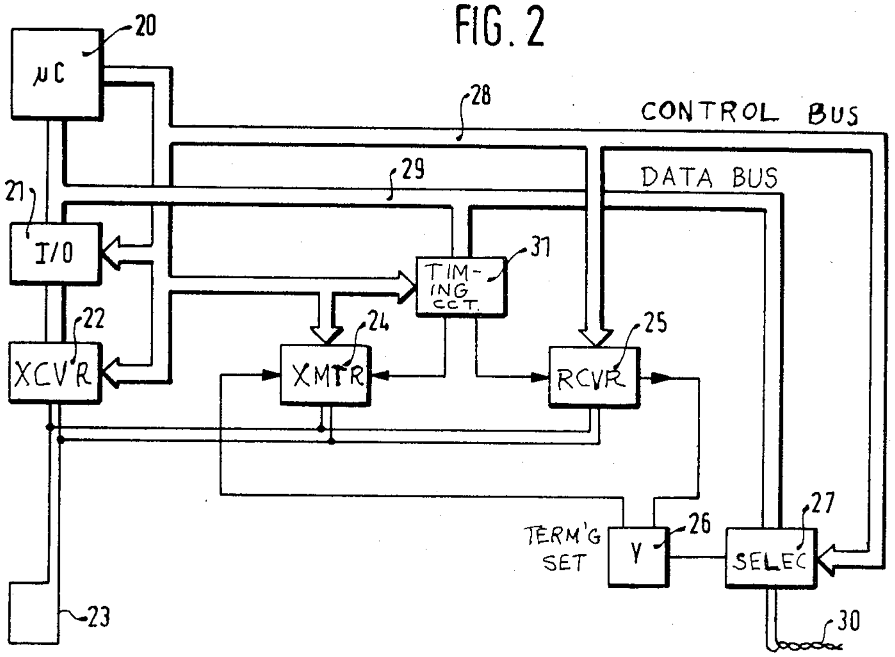
FIG. 2 is a block circuit diagram of the road portion of the first embodiment of the invention.

FIG. 2 shows the roadway apparatus for connection of the vehicular telephone with the public telephone network. The microcomputer 20 of the loop apparatus is connected through a control bus 28 with the input-/output unit 21, the transmitter/receiver 22, a transmitter 24, a receiver 25, a timing pulse preparation unit 31 and a selecting device (dial or tone-pad) 27. The data bus 29 is connected with the selector 27, the clock pulse preparation unit 31 and, through the input/output unit 28 with the transmitter/receiver 22. The transmitter/-receiver 22 corresponds to a normal traffic information loop apparatus. The transmitter/receiver 22 is connected with the loop 23. For telephone connections, the transmitter 24, the receiver 25 and the pulse preparation circuit 31 are necessary just as in the case of the vehicular equipment. The transmitter 24 and the receiver 25 are interconnected by a 4-wire terminating set 26 that provides a conventional transition from a two-wire circuit to a four-wire circuit. The four-wire terminating circuit provides the necessary split into the output and return channels necessary for talking back and forth. Such circuits are well known in telephone practice and have been developed in a large variety of well-known circuits. They make possible avoidance of voice-operated or manual directional switching and are balanced to avoid the generation of oscillations or echoes. The selection device 27 is also necessary for effective connection of the system to telephone lines. The generation of the dial pulses is performed by the microcomputer 20 of the loop-connected equipment and for this purpose that equipment is connected over the control bus 28 and the data bus 29 to the selector 27.

A telephone connection takes place as follows. If the automobile driver intends to make a telephone call, he drives into the next parking place that has a built-in telephone loop. As soon as the vehicle comes to a stop, as is recognized by the travel path transmitter 6, the microcomputer 20 of the stationary loop equipment sends out call pulses such as are normal in the operation of a traffic information system which has been approached by a vehicle. The number of these "stepping" pulses can be greatly reduced compared to the usual traffic information system practice. It is enough to have about one call step pulse per second. When the driver is located on a recognized loop position and has come to a stop with his vehicle, he picks up the telephone handset 14 of the vehicle equipment, which is in turn connected to the transmitter 8 and the receiver 7. The microcomputer 1 of the vehicle equipment now answers to the next call step pulse of the loop-connected equipment, with a data "telegram" such as is known from traffic information system transmission practice. Only the key word, for example in byte 1 of the telegram, is altered. The vehicle number and the private telephone number of the driver can now be transmitted for toll charging purposes in the normal traffic information system mode of operation. For additional security, it is possible, for example, to transmit a code word in the form of a multispace decimal number. The microprocessor 20 of the loop-connected equipment now awaits the dial tone of the central office which it will receive through the selector 27 that is connected through the line 30 to the public telephone network. The dial tone is now transmitted to the vehicle over the data channel of the traffic information system.

The vehicle driver can now enter the desired called party telephone number by means of the keyboard of the unit 3. It is also possible to provide frequently called numbers in a store of the microprocessor 1, from which they can be called out to increase the ease of operation of the vehicular telephone. The desired called party number is then transmitted over the traffic information channel to the microcomputer 20 of the loop-connected equipment. The latter then starts the normal dialing or tone calling process in the selector 27. It is useful to incorporate an automatic redialing procedure in the event that a busy signal is received during or after the selection operation.

When the call recognition is sent from the central office, the microcomputer 20 of the roadway loop equipment provides this information over a data channel of the traffic information system to the vehicular equipment. Then the microcomputer 1 of the vehicular equipment and the microcomputer 20 of the loop equipment switch out the traffic information transmitter/-receiver 4 and 22 and switch in the transmitters 8 and 24 and the receivers 7 and 25. A direct connection to the telephone instrument is thereby established from the telephone line, through the selector 27, over the four-wire terminating circuit 26 and over the transmitter and receiver. What follows is the same as in the case of a normal telephone conversation. The microcomputers of the vehicular equipment 1 and of the loop equipment 20 respectively check through their receivers 7 and 25 whether the connection still exists. If the automobile driver or passenger puts the telephone instrument back in its resting place, the vehicle microcomputer 1 switches the transmitter 8 off and the microcomputer 20 of the loop equipment recognizes by a missing reception signal the termination of the telephone conversation and goes back into the mode for data exchange for traffic information. At the same time it interrupts the connection to the telephone line through the selector apparatus 27.

In the case of termination of the telephone conversation by the remote party, the microcomputer 20 of the loop equipment recognizes the termination of the telephone conversation through the selector 27. It switches the transmitter 27 off and switches on the transmitter/receiver component group 22. The microcomputer 1 of the vehicle equipment now recognizes the breaking off of the telephone connection by the absence of the reception signal. The vehicle driver or passenger is then urged to replace the telephone instrument on its stand or hook by the provision of an optical and/or an acoustic signal.

After the telephone connection is broken off, the loop-connected equipment goes back into the call step mode and the loop is free for other telephone connections.

THE SECOND ILLUSTRATED EMBODIMENT

Figure 3:
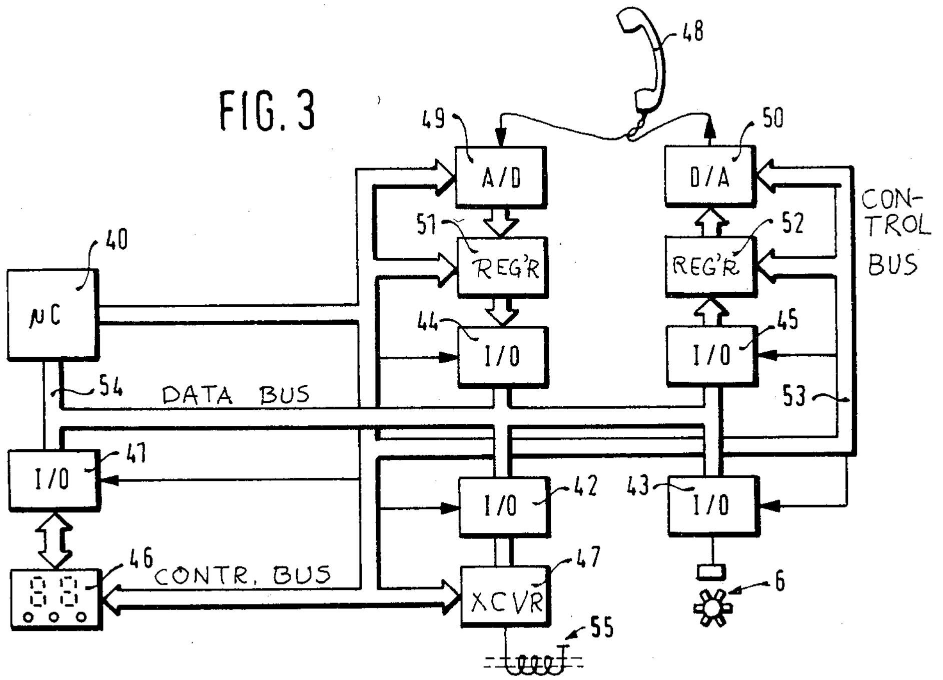
FIG. 3 is a block circuit diagram of the vehicular portion of a second embodiment of the invention.

Instead of the analog transmission of the telephone conversation, it is also possible to provide digital transmission of speech. FIG. 3 shows an example of the vehicular equipment in such a case. The combined vehicular equipment for telephone communication and traffic information transmission again contains the microprocessor 40 necessary for the normal traffic information transmission. The microprocessor 40 is connected by a control bus 53 with input/output units 41, 42 and 43. The control bus 53 continues on to an analog-to-digital converter 49, a digital-to-analog converter 50, a register 51, a register 52 and to input/output units 44 and 45. The data bus 54 leads from the microprocessor 40 through the input/output unit 41 to a keyboard and display unit 46 and to the input/output units 42, 43, 44 and 45. A transmitter/receiver 47 has a transmitter output and receiver input connected to a ferrite antenna 51 and is controlled by the input/output unit 42. The travel path transducer 6 is connected to the input/output unit 43. A telephone handset 48 is connected to the A/D converter 49 and the D/A converter 50.

Figure 4:
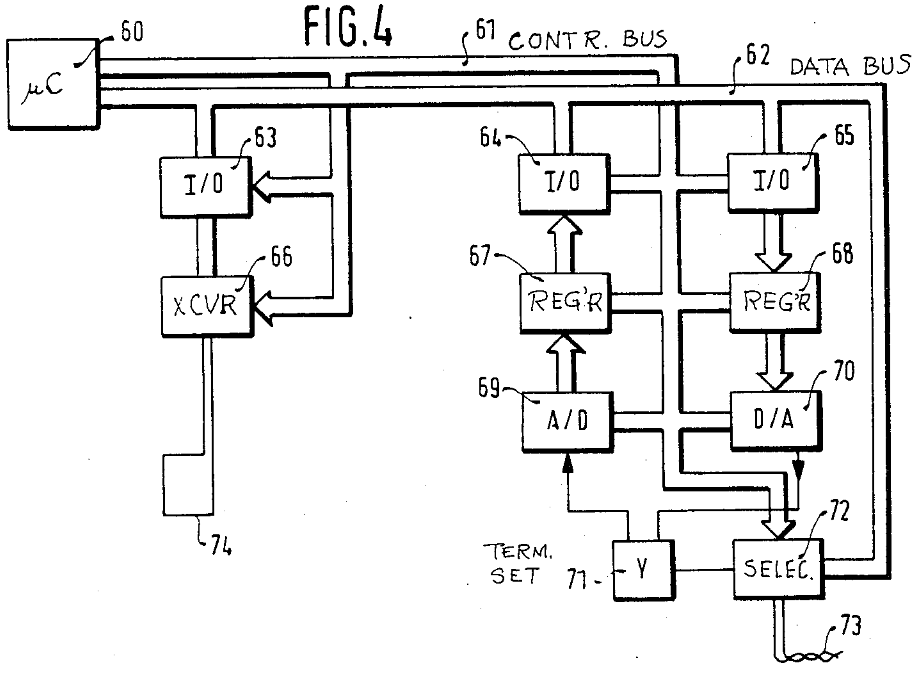
FIG. 4 is a block circuit diagram of the fixed portion of the said second embodiment.

The digital converter groups 49 and 50 and the registers 51 and 52 now take the place of the component groups necessary for the analog connection in the first embodiment shown in FIG. 1. The analog-to-digital converter 49 includes a microphone amplifier, a low-pass filter with a cut-off frequency of 3.4 kHz and a sample-and-hold circuit for 8 kHz. It processes a signal 8-bit wide in accordance with the CCITT standard. The digital values formed to correspond to the analog signal are supplied to the register 51. The digital-to-analog converter 50 includes, in addition to a digital-to-analog converter according to the CCITT standard, a low-pass filter of 3.4 kHz cut-off frequency and an amplifier for driving the telephone receiver. The manner of operation of this collection of circuits will presently be described in connection with the loop-connected equipment shown in FIG. 4.

The microprocessor 60 is connected to its control bus 61 and its data bus 62 and with the other component groups of the loop-connected equipment. Registers 67 and 68 are controlled through input/output circuits 63,64 and 65. These registers are respectively connected with an analog-to-digital converter 69 and a digital-to-analog converter 70. A four-wire terminating circuit 71 is connected to the converters 69 and 70. A telephone line 73 leads from the selector device 72 over to a telephone central office not shown. A transmitter/receiver 66 is provided, to the output of which the loop 74 is connected.

The setting up of a telephone connection takes place with reference to the selection operation as already described. When the call signal is recognized over the telephone line by the selector 72, the microcomputer 60 of the loop-connected equipment provides to the vehicular equipment a special code word over the traffic information channel. The microcomputers 40 and 60 of the vehicular equipment and of the loop-connected equipment now switch over the transmitter/receiver groups 47 and 72 to FFSK (fast frequency shift keying). In consequence, 8-bit words are alternately exchanged over the transmitter/receiver component groups 47 and 72 between vehicle and roadway loop, the 8-bit words being exchanged alternately from the register 51 to the register 68 and from the register 67 to the register 52.

Since the data rates in the FFSK mode can reach as much as 96 k bits per second and an 8-bit wide word is intermediately stored in each of the registers, a quasi continuous data transport in both directions in each case of 48 k bits per second, takes place, which corresponds to the CCITT recommendatons. The transmission of speech thus takes place over the data transmission channels that otherwise are used for transmitting the traffic information. Separate apparatus modulated in an analog manner are therefore not necessary in this embodiment.

Although the invention has been described with reference to particular illustrative examples, it will be understood that modifications and variations are possible within the inventive concept. For example, the vehicle speedometer may be equipped to indicate when the vehicle is standing still, instead of the vehicle travel measurement device usually included in an "ALI" traffic information system.

We claim:

1. In a system for guiding road vehicles respectively to destinations selected by their owners or drivers, comprising inductive transmitter/receiver installations including subsurface inductive field generating and sensing loops set at various locations in roadways, said installations being connected together in a traffic information system, and inductive transmitter/receiver apparatus installed in road vehicles, connected to vehicle-mounted inductive field generating/sensing means and associated with means for entering selected destination indicia for transmission and means for displaying recieved information, said transmitter/receiver installations and apparatus being constituted so as to transmit and receive digitally encoded signals, the improvement of providing in said system, for built-in access from said road vehicles to a telephone communication network, apparatus comprising:

at least some of said roadway transmitter/receiver installations set in parking and/or roadside pause areas for exchange of signals with temporarily stationary vehicles and including modulated wave transmitter/receiver equipment connected to said subsurface loops and activateable to establish two-way connections with a telephone communication network;

modulated wave transmitter/receiver equipment in said road vehicle connected to said vehicle-mounted loops of the respective vehicles and selectively activatable to supersede said transmitter/-receiver apparatus for digitally encoded signals and to cooperate with said modulated wave transmitter/receiver equipment of said installations set in parking and/or roadside pause areas for establishing and holding telephone communications between a vehicle and said telephone communication network, means being also provided for generation and response to telephone supervisory signals for initiating and terminating telephone calls and for generation of selective calling signals in said vehicles for directing telephone calls, and means responsive to vehicle motion for blocking activation of said modulated wave transmitter/-receiver equipment while said vehicle is traveling.

2. Improvement according to claim 1 in which said modulated wave transmitter/receiver equipment is constituted to utilize amplitude modulation.

3. Improvement according to claim 1 in which said modulated wave transmitter/receiver equipment is constituted to utilize frequency modulation.

4. Improvement according to claim 1 in which carrier and supervisory signal frequencies for telephone communication are derived from the clock frequency of said system for guiding road vehicles.

5. Improvement according to claim 1 in which separate modulated wave channels are utilized for each direction of communication between a vehicle and a road installation.

6. Improvement according to claim 5 in which hybrid 2-wire to 4-wire branching circuits (96,71) are provided in said roadway transmitter/receiver installations for splitting a two-way telephone channel into outward and inward one-way telephone channels.

7. Improvement according to claim 1 in which selective calling and supervisory signal pulses for telephone communication are provided as digital signals transmitted normally in the channels of said system for guiding road vehicles.

8. Improvement according to claim 1 in which selective calling and supervisory signals are transmitted as tone signals in the speech channel of said modulated wave transmitter/receiver equipment.

9. Improvement according to claim 1 in which means are provided for transmission of a coded signal identifying the vehicle and/or the user in response to an interrogating signal from said roadway installation before a telephone connection between called party and calling party is established.

10. Improvement according to claim 1 in which activation of said modulated wave transmitter/receiver equipment in said road vehicles to supersede said transmitter/receiver apparatus for digitally encoded signals in response to a digitally-encoded key word.

11. In a system for guiding road vehicles to destinations respectively selected by their owners or drivers, comprising inductive transmitter/receiver installations including subsurface inductive field generating and sensing loops set at various locations in roadways, said installations being connected together in a road traffic information system, and inductive transmitter/receiver apparatus installed in road vehicles, connected to vehicle-mounted inductive field generating/sensing means and associated with means for entering selected destination inditia for transmission and means for displaying received information, said transmitter/receiver installations and apparatus being constituted so as to transmit and receive digitally encoded signals, the improvement of providing, in said system, built-in access from said road vehicles to a telephone communication network, comprising:

at least some of said roadway transmitter/receiver installations set in parking and/or roadside pause areas for exchange of signals with temporarily stationary vehicles and including analog-to-digital and digital-to-analog conversion means respectively for incoming and outgoing signals of at least one telephone line and input/output units for each of said conversion means interposed between the respective said conversion means and transmitter/-receiver portions of said installations;

analog-to-digital and digital-to-analog conversion means respectively for the transmitter and receiver portion of a telephone handset and input/output units for each of said conversion means interposed between them and said transmitter/receiver apparatus installed in road vehicles and constituted so as to transmit and receive digitally-encoded signals;

and means for programming the transmission and reception of digitally encoded signals by said transmitter/receiver apparatus and installations for serving either said system for guiding road vehicles or providing telephone communication, according to whether a road vehicle is stopped at the location of one of said roadway installations and a telephone handset in said vehicle has been displaced from its inactive position.

12. Improvement according to claim 11 in which registers are interposed between said conversion means and the corresponding input/output unit provided therefor, said input/output unit being constituted for cooperation with said registers in effecting transmission of digital signals of a predetermined fixed length alternately in opposited directions between one of said roadway installations and a said transmitter/receiver apparatus installed in a road vehicle.

13. Improvement according to claim 12 in which means are provided for generating digital signals corresponding to telephone communication supervisory and selective calling signals and for transmitting them between a said roadway installation and a said transmitter/receiver apparatus installed in a road vehicle in the same manner as other digital signals are transmitted therebetween.

14. Improvement according to claim 11 in which means are provided for transmission of a coded signal identifying the vehicle and/or the user in response to an interrogating signal from said roadway installation before a telephone connection between a called party and a calling party is established.

15. Improvement according to claim 13 in which means are provided for interruption of transmission of traffic information and guiding signals between a vehicle and one of said roadway installations in response to one of said telephone communication supervisory signals indicating the initiation of a telephone call.

16. Apparatus according to claim 11 in which said system includes a microcomputer in each of said vehicles and in each of said roadway installations and in which said microcomputers in said vehicles are constituted so as to store telephone numbers and to provide automatic repetition of an attempt to establish a telephone call after a first attempt has resulted in reception of a busy signal.

* * * * *